(No Model.)
C. V. PETRAEUS.
PROCESS OF MANUFACTURING OXIDE OF ZINC PIGMENT.
No. 496,205. Patented Apr. 25, 1893.
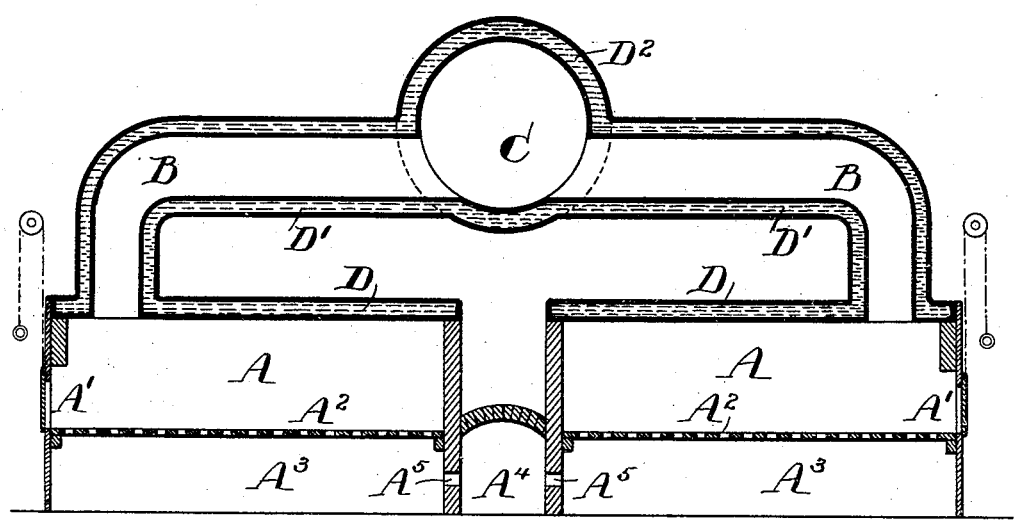
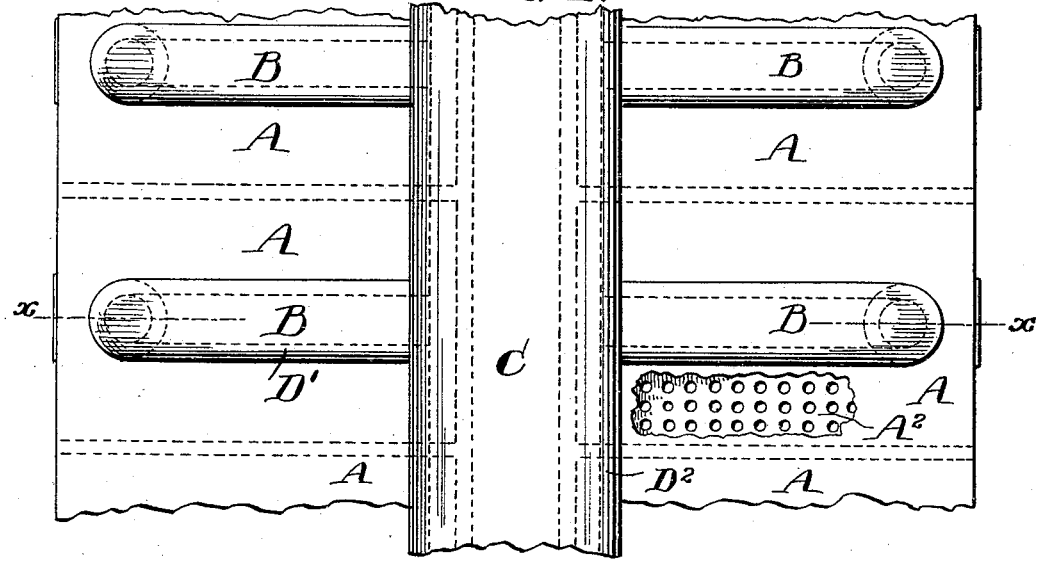
WITNESSES:
INVENTOR:

UNITED STATES PATENT OFFICE.

CARL V. PETRAEUS, OF JOPLIN, MISSOURI, ASSIGNOR TO OLIVER H. PICHER, OF SAME PLACE.

PROCESS OF MANUFACTURING OXIDE-OF-ZINC PIGMENTS.

SPECIFICATION forming part of Letters Patent No. 496,205, dated April 25, 1893.

Application filed April 23, 1892. Serial No. 430,336. (No specimens.)

*To all whom it may concern:*

Be it known that I, CARL V. PETRAEUS, of Joplin, county of Jasper, State of Missouri, have invented a certain new and useful Process of Manufacturing Oxide-of-Zinc Pigments, of which the following is a true and exact description, reference being had to the accompanying drawings, which form a part of this specification.

My invention relates to the manufacture of oxide of zinc pigment from sulphur bearing zinc ores, and has for its object to enable me to manufacture a pigment free from injurious sulphur compounds from such ores.

Heretofore zinc ores have been mixed with carbon and the mixture ignited in the well-known Wetherill furnace to drive off the zinc oxide which is caught in bags after the gases, fumes, &c., have been cooled down to a proper degree; but in order to obtain a white pigment it is the rule to maintain the gases and fumes after they leave the furnace at a temperature at or above a bright red and in an oxidizing atmosphere so as to burn out the particles of carbon and to oxidize any fumes of metallic zinc and thus secure a white pigment. The necessary temperature is secured by providing the furnace with a brick arch and a fire brick flue which will store up heat and thus insure the desired temperature for a sufficient length of time as the fumes pass on their way to the working flues and bag house. In cases where sulphur is present, however, sulphurous acid gas is given off by the furnace and at the high temperature necessary to whiten the fumes, the gas in admixture with an excess of oxygen, aqueous vapor and zinc oxide will and does form sulphate of zinc which is difficult to eliminate from the zinc oxide, and which very materially lessens its value as a pigment. I have discovered that by promptly cooling the fumes and gases from the furnace below a bright red (say to a cherry red) that this injurious reaction is avoided. The sulphurous acid gas will for the most part pass off through the bag screens, and such part of it as may combine with the zinc oxide, and some, particularly in damp weather, will combine to form sulphite of zinc. The zinc oxide collected by this treatment is not free from discoloration, but the particles which darken it, and any zinc sulphite present are driven off by heating the oxide to a red heat, as a result of which I obtain a white pigment entirely free from sulphur compounds which would impair its value.

The necessary lowering of the temperature of the fumes and gases driven off from the furnace may be accomplished by the use of any convenient cooling devices, as, for instance; by the use of an arch made up of water jackets and an air cooled flue leading therefrom.

Reference is now had to the drawings which illustrate an apparatus adapted for use in my process, in which, Figure 1 is a sectional elevation on the line $x$—$x$ of Fig. 2, and, Fig. 2 a plan view of a series of furnaces for making zinc oxide.

A A, &c., indicate Wetherill furnaces having perforated grates $A^2$ charging doors $A'$ ash pits $A^3$ and a blast conduit $A^4$ opening into each furnace by a passage $A^5$.

B B, &c., indicate flues leading from each furnace to a common flue C and as shown I have provided water cooled tops D to the furnaces and water jackets $D'$ and $D^2$ to the flues B and C. By thus cooling the flues I rapidly reduce the temperature of the fume and prevent it attaining a bright red heat. Of course any desired plan of cooling the flues or top of the furnaces may be employed and I only show the plan of the drawings as one effective way of accomplishing the result.

Having now described my invention, what I claim as new, and desire to secure by Letters Patent, is—

The process of manufacturing zinc oxide pigment from sulphur-bearing zinc ores which consists in subliming the zinc, reducing the temperature of the gases and zinc oxide driven off below a bright red heat, at which temperature sulphate of zinc will form, catching the zinc oxide fumes and finally heating said collected fumes to a read heat to whiten and free it from sulphur compounds, all substantially as specified.

CARL V. PETRAEUS.

Witnesses:
 JNO C. KEENAN,
 W. C. PORTER.